United States Patent
Park

[19]

[11] Patent Number: 6,125,263
[45] Date of Patent: Sep. 26, 2000

[54] RADIO PAGING RECEIVER AND METHOD FOR RECEIVING NON-STANDARD RADIO PAGING SIGNAL

[75] Inventor: Keon-Young Park, Kumi-shi, Rep. of Korea

[73] Assignee: Samsung Electronics Co., Ltd., Rep. of Korea

[21] Appl. No.: 09/217,044

[22] Filed: Dec. 21, 1998

[30] Foreign Application Priority Data

Dec. 26, 1997 [KR] Rep. of Korea ...................... 97-74172

[51] Int. Cl.[7] ...................................................... H04Q 7/18
[52] U.S. Cl. ........................ 455/38.3; 455/343; 340/311.1
[58] Field of Search ................................. 455/38.2, 38.3, 455/127, 343, 515, 574, 38.1; 340/825.44, 825.21, 827.27, 311.1

[56] References Cited

U.S. PATENT DOCUMENTS

| | | | |
|---|---|---|---|
| 4,837,854 | 6/1989 | Oyagi et al. | 455/343 |
| 4,839,639 | 6/1989 | Sato et al. | 340/825.44 |
| 5,384,564 | 1/1995 | Wycoff et al. | 340/825.44 |
| 5,821,873 | 10/1998 | Lerner et al. | 340/825.44 |
| 5,929,772 | 7/1999 | Hwang | 340/825.44 |
| 6,028,529 | 2/2000 | Gotou | 340/825.44 |

*Primary Examiner*—Edward F. Urban
*Assistant Examiner*—Congvan Tran
*Attorney, Agent, or Firm*—Dilworth & Barrese

[57] ABSTRACT

A radio paging receiver (pager) and method for receiving a non-standard radio paging signal including a relatively short burst of preamble data. If a non-standard radio paging signal is received, the pager alters an ON/OFF cycle of a battery saving signal that controls the supply of operating power to electronics within the pager. An ON period of the battery saving signal is maintained and an OFF period thereof is shortened by one half, thereby improving the signal reception success rate of the pager.

11 Claims, 4 Drawing Sheets

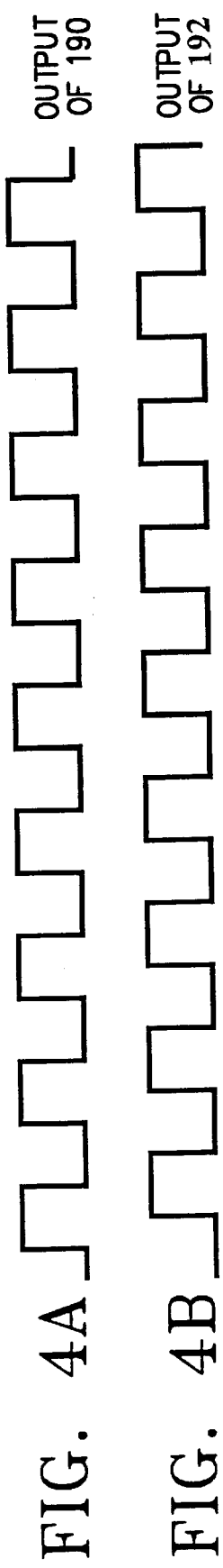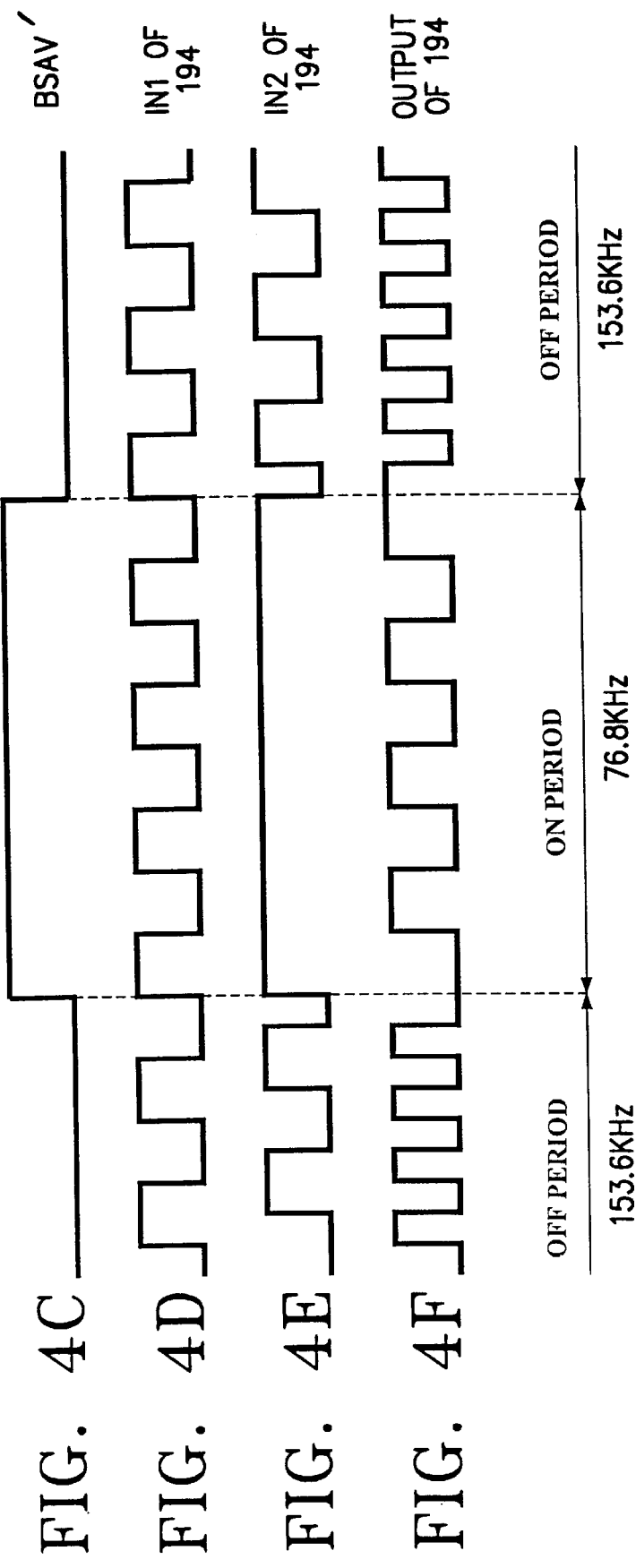

RADIO PAGING RECEIVER AND METHOD FOR RECEIVING NON-STANDARD RADIO PAGING SIGNAL

BACKGROUND OF THE INVENTION

1. Field of the Invention

The present invention relates to a radio paging receiver and method for receiving and decoding a non-standard radio paging signal having reduced preamble data.

2. Description of the Related Art

A radio paging receiver (pager) receives and analyzes radio paging information of a specific format. Upon detecting a unique self-identification code from an incoming page, the pager generates an alert tone and displays the paging information.

FIG. 1 is a block diagram of circuitry within a conventional paging receiver that receives paging information called a POCSAG code. According to the CCIR standard, the POCSAG code is comprised of a 576-bit preamble and a plurality of batches. The preamble is a reversible code having a binary "1" and "0" repeated during 576 bits. One POCSAG code usually includes between 30 and 60 batches. Each batch consists of a 32-bit word synchronization code and eight frames of 64 bits each. A radio frequency (RF) receiver 110 receives an RF signal in a POCSAG format through antenna AT. RF receiver 110 frequency-converts, demodulates and shapes the waveform of the received RF signal. A decoder 120 decodes the resulting signal RX output by receiver 110 and sets an operating mode of the pager based on the decoded information. More particularly, during an idle mode, decoder 120 generates a time-varying battery saving signal BSAV which controls a switch 140 coupled between a battery 130 and RF receiver 110, to thereby control operating power supplied to receiver 110. In the idle mode, battery power is saved as switch 140 is periodically opened and closed in accordance with the BSAV signal. When switch 140 is closed in the idle mode, the pager detects incoming preamble data. During a batch mode, decoder 120 detects word synchronization data and frame data, and decodes the detected frame data into its original form.

The battery saving signal BSAV satisfies the CCIR standard. Since, in accordance with this standard, the preamble data contains at least 576 bits, the BSAV signal typically has an OFF period of 512 bits and an ON period of 48 bits. If a preamble data signal containing less than 500 bits is transmitted, which does not satisfy the CCIR standard, the paging receiver does not normally decode it. This phenomenon can frequently happen in a radio paging system with an incomplete configuration. Therefore, for radio pagers operating within such a radio paging system, call success rates are dramatically reduced.

SUMMARY OF THE INVENTION

It is an object of the present invention to provide a radio paging receiver and method for receiving a non-standard radio paging signal including preamble data which does not satisfy the CCIR standard.

It is another object of the present invention to provide a radio paging receiver and method for improving the signal reception success rate when non-standard paging signals are transmitted by a radio paging system.

In an illustrative embodiment of the invention, a radio paging receiver includes an antenna, an RF receiver for receiving a radio paging signal through the antenna, and a battery for supplying operating power to the RF receiver. A switch coupled between the RF receiver and the battery selectively routs the operating power during an idle mode of the pager to the RF receiver in accordance with a battery saving signal supplied thereto.

To reduce the duration of an off period of the idle mode, the off period of the battery saving signal is reduced, e.g., by one half. This is accomplished by means of an oscillator that provides an oscillating signal having a preset frequency, a delay circuit for delaying the oscillating signal to provide a delayed signal, and an exclusive OR (XOR) gate. The XOR gate respectively receives, through first and second input terminals thereof, the oscillating signal and a second signal derived from the delayed signal and the battery saving signal. A decoder performs the dual function of decoding an output signal of the RF receiver, and supplying the battery saving signal in accordance with the frequency of the XOR gate output signal. By employing a 90° delay for the delay circuit, the frequency of the XOR output signal is doubled during the off period, thereby shortening the duration of the off period by one half. As a result, paging signals with reduced preamble data are more reliably received.

BRIEF DESCRIPTION OF THE DRAWINGS

The above and other objects, features and advantages of the present invention will become more apparent from the following detailed description when taken in conjunction with the accompanying drawings throughout which like reference numerals designate like elements. In the drawings:

FIGS. 4A–4F are timing diagrams of signals during OFF and ON periods of a battery saving signal according to a preferred embodiment of the present invention.

DETAILED DESCRIPTION OF THE PREFERRED EMBODIMENT

A preferred embodiment of the present invention will be described hereinbelow with reference to the accompanying drawings. In the following description, well-known functions or configurations are not described in detail so as not to obscure the present invention.

Figure 1:
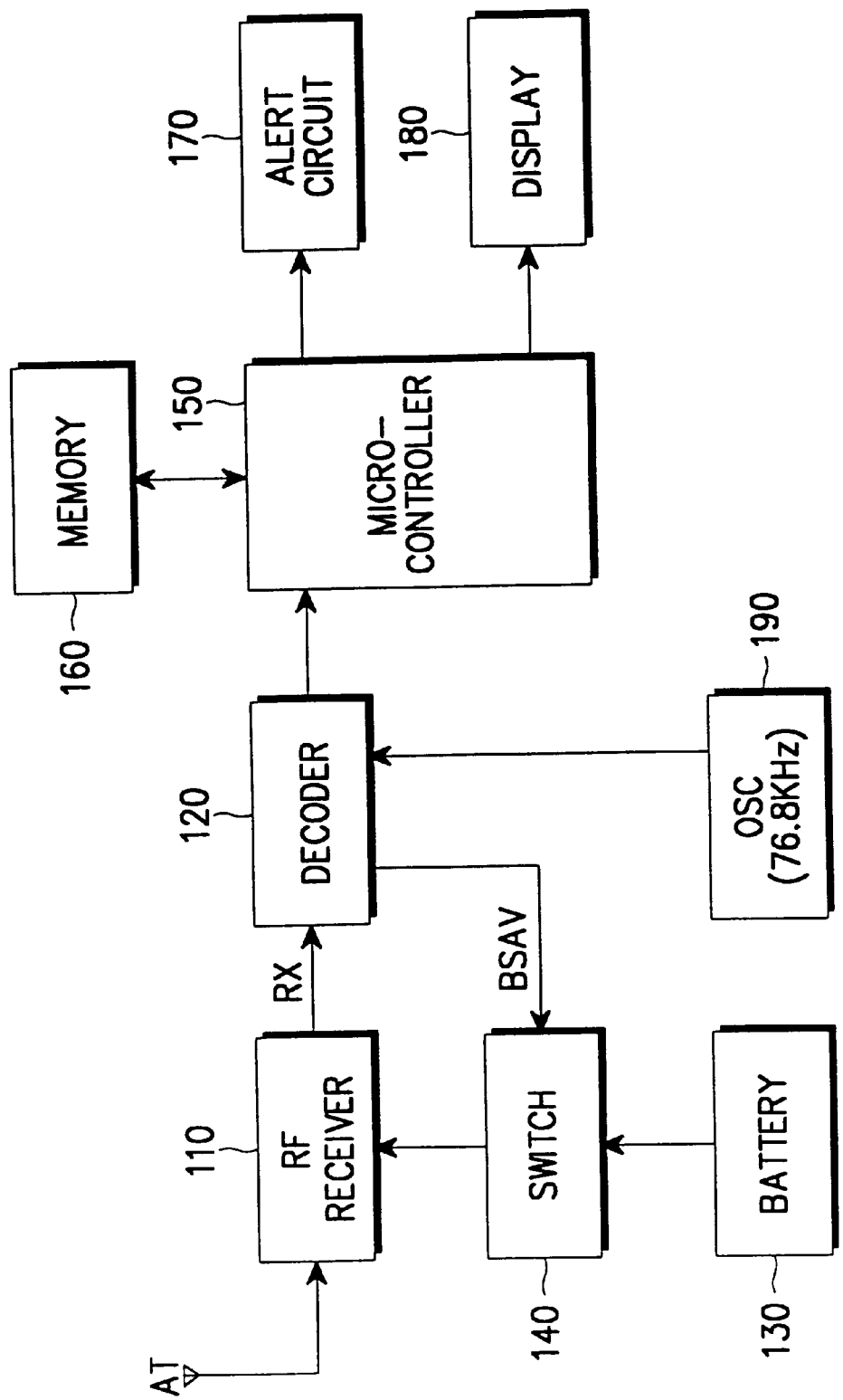
FIG. 1 is a block diagram of a conventional radio paging receiver.
Figure 2:
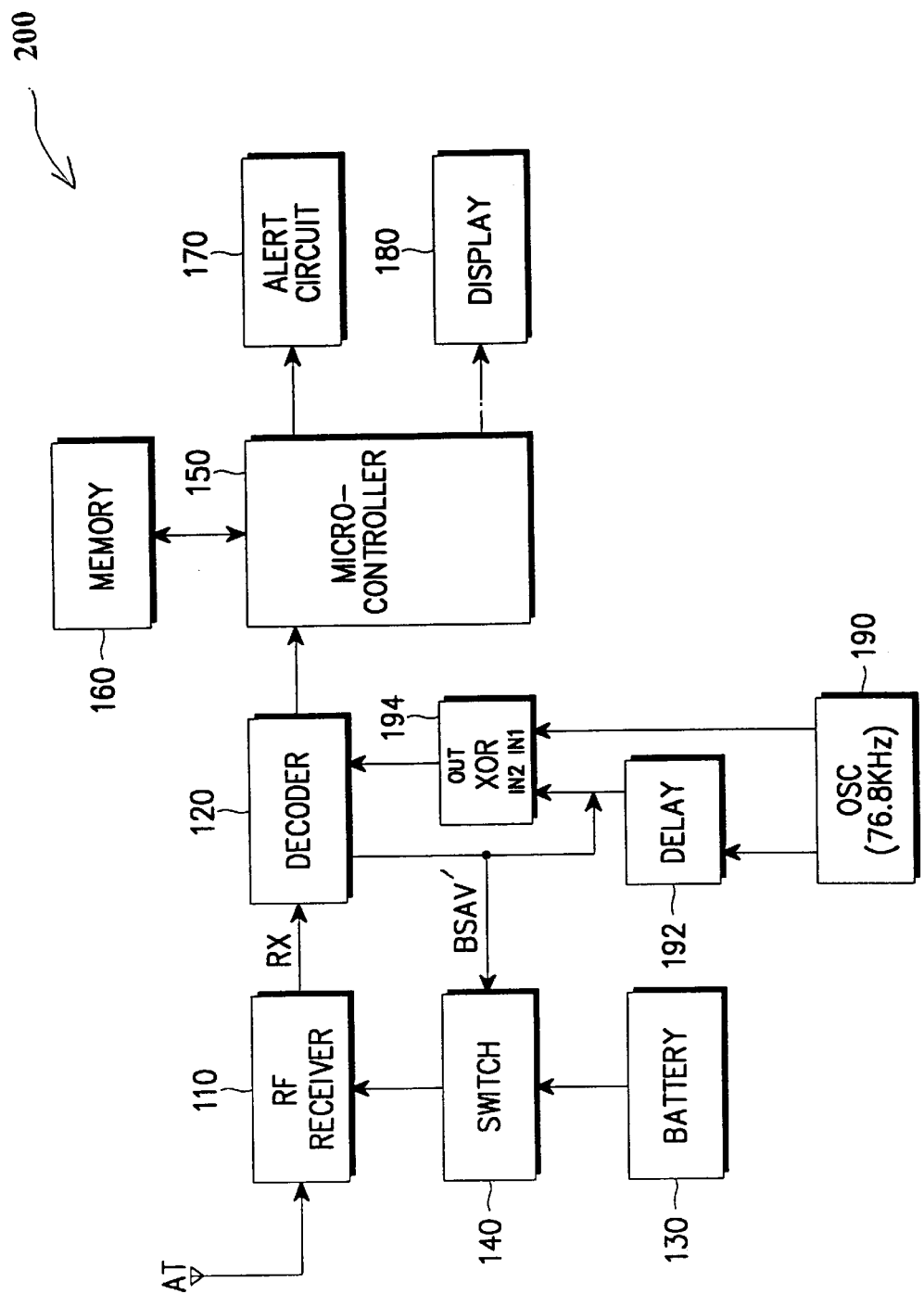
FIG. 2 is a block diagram of a radio paging receiver according to a preferred embodiment of the present invention.

Referring now to FIG. 2, an illustrative embodiment of a radio paging receiver (radio pager) 200 in accordance with the invention is shown in block diagram form. Pager 200 includes RF receiver 110, decoder 120, battery 130, switch 140, microcontroller 150, memory 160, alert circuit 170, display 180, and oscillator 190, all of which may be of conventional designs. (The above components are also shown in FIG. 1.) Pager 200 further includes a delay circuit 192 and an exclusive OR (XOR) gate 194. Decoder 120 generates a battery saving signal BSAV' in accordance with the diagrams of FIGS. 3A–3C and FIGS. 4A–4F, as will be explained.

In operation, RF receiver 110 receives a radio paging signal through antenna AT. Receiver 110 frequency-converts, demodulates and shapes the waveform of the radio paging signal, and generates therefrom digital radio paging data. Decoder 120 decodes the digital radio paging data and sets the operating mode of pager 200 as either an idle mode or a batch mode. During the idle mode, decoder 120 supplies battery saving signal BSAV' having a preset period to switch 140. Signal BSAV' performs a similar function as the above-described signal BSAV, which is to open switch 140 for the majority of time in the idle mode, thereby conserving battery life. In the idle mode, when switch 140 is closed, pager 200 detects preamble data. Decoder 120 essentially controls operating power supplied to RF receiver 110 in the idle mode by means of signal BSAV' controlling the switching state of switch 140. Signal BSAV' differs from signal BSAV in that the off period is relatively shorter so as to enable more reliable decoding of non-standard preamble signals that have a reduced number of data bits. During the batch mode, decoder 120 detects word synchronization data and frame data, and decodes the detected frame data into the corresponding original data. During the batch mode, decoder 120 receives a 76.8 KHz square wave signal provided by frequency oscillator 190 and performs the above-described operation.

Microcontroller 150 controls the overall operation of radio paging receiver 200. Microcontroller 150 receives the decoded data generated from decoder 120 and generates an alert control signal or a display control signal. The alert circuit 170 responds to the alert control signal by generating an alert signal, such as a tone signal or a vibration signal, to inform a user that he/she is being paged. Display 180 displays a caller message and status information of the radio paging receiver in response to the display control signal generated by microcontroller 150. Typically, the caller message is a caller telephone number. Memory 160 stores unique address information assigned to the radio paging receiver 200 and stores frame information. The memory 160 also stores the caller message processed by microcontroller 150.

Delay circuit 192 and XOR gate 194 are connected between frequency oscillator 190 and decoder 120. Oscillator 190 provides a fixed frequency square wave output signal (oscillation signal), e.g., at 76.8 KHz, to a first input terminal IN1 of XOR gate 194. The oscillation signal is also provided to an input of a delay circuit 192. Delay circuit 192 delays the oscillation signal preferably by 90° as shown in FIGS. 3B and 4B, so that the leading edge of the delayed signal output by delay circuit 192 occurs midway between the positive pulse portion of the oscillation signal output by oscillator 190. The delayed oscillation signal output by delay circuit 192 is supplied to a second input terminal IN2 of XOR gate 194. The battery saving signal BSAV' generated by decoder 120 is supplied to the second input terminal IN2 of XOR gate 194, together with the output of the delay circuit 192. Therefore, XOR gate 194 receives the oscillating signal through its first input terminal IN1, and the delayed oscillating signal and the battery saving signal BSAV' through its second input terminal, and then generates an XOR output signal. The XOR output signal is a logic low (binary 0) for inputs of 0,0 or 1,1 at terminals IN1 and IN2, and a logic high (binary 1)for inputs of 0,1 or 1,0. Note that when BSAV' is high, the signal level at input terminal IN2 is always high, regardless of the logic level of the delayed signal from delay circuit 192. When BSAV' is low, the logic level at input terminal IN2 is always the same as the delayed signal.

Even if a non-standard radio paging signal including preamble data which does not satisfy the CCIR standard is received, radio paging receiver 200 can receive and decode the non-standard radio paging signal by controlling a 48-bit ON period and a 512-bit OFF period of the battery saving signal BSAV'. The ON and OFF periods of the battery saving signal BSAV may be altered by the operation result of the XOR gate 194. If a standard radio page is received, the decoder 120 generates the battery saving signal BSAV' with the same characteristics as the BSAV signal of the CCIR standard, i.e., having the 48-bit ON period and the 512-bit OFF period. However, if a non-standard radio paging signal including the preamble data which does not satisfy the CCIR standard is received, e.g., the preamble data is less than 500 bits, then decoder 120 maintains the ON period of the battery saving signal BSAV' but shortens the OFF period thereof by one half. That is, decoder 120 provides the battery saving signal BSAV' as having a 48-bit ON period and a 256-bit OFF period. This will be referred to herein as the non-standard operating mode. To alter the OFF period of signal BSAV', the XOR gate 194 receives, through its first input terminal IN1, the signal of 76.8 KHz oscillated by the frequency oscillator 190, and, through its second input terminal IN2, the signal of 76.8 KHz delayed by the delay circuit 192 and the battery saving signal BSAV' generated by decoder 120, and generates the exclusive OR output. Decoder 120 receives the XOR output of XOR gate 194 and generates a corresponding battery saving signal.

Figure 3A:
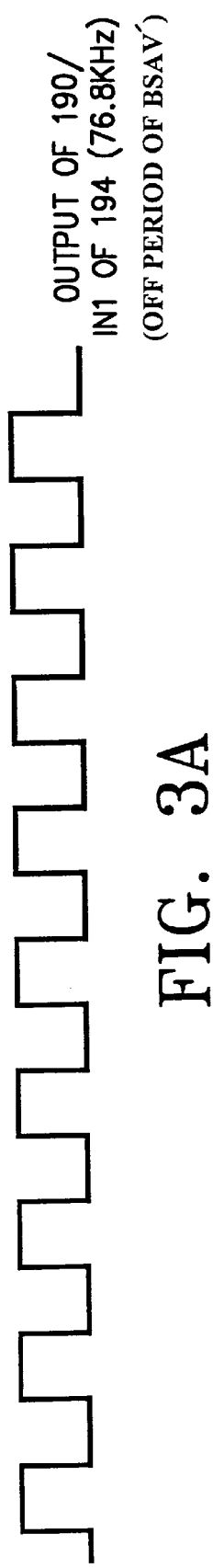
FIGS. 3A–3C are timing diagrams of signals during an OFF period of a battery saving signal according to a preferred embodiment of the present invention.
Figure 3B:
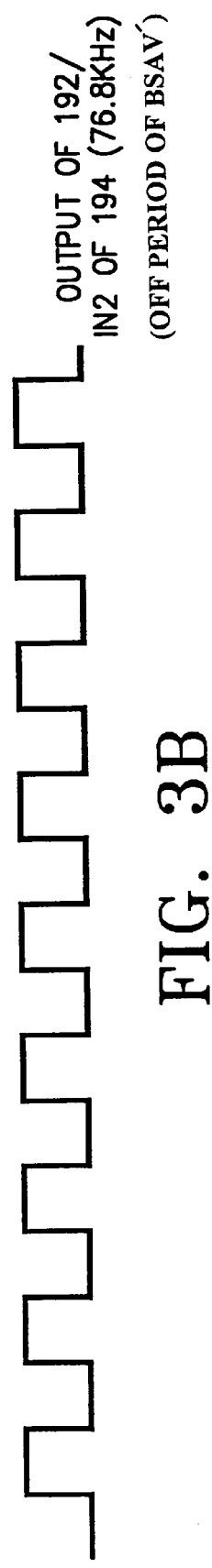
Figure 3C:
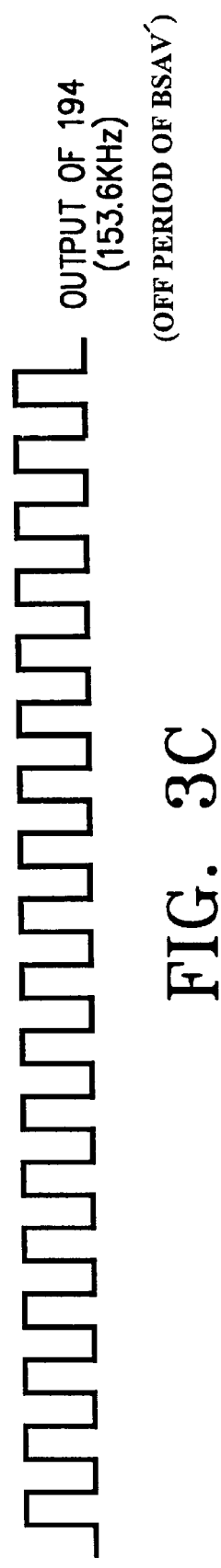

FIGS. 3A to 3C are timing diagrams of signals during the OFF period of the battery saving signal BSAV' . FIGS. 4A to 4F are timing diagrams of signals during both the OFF and ON periods of signal BSAV'. During the OFF period, XOR gate 194 receives the square wave oscillating signal of 76.8 KHz as shown in FIG. 3A and the delayed oscillating signal as shown in FIG. 3B, and generates a signal of 153.6 KHz as shown in FIG. 3C, which is twice the frequency of the 76.8 KHz oscillating signal. In the non-standard operating mode, the period (duration) of the battery saving signal BSAV' is inversely proportional to the instantaneous frequency of the oscillating signal applied to decoder 120. Therefore, in this embodiment, the period of signal BSAV' is shortened by one half during the OFF periods of the non-standard operating mode. That is, the period of signal BSAV' is changed to 48-bit ON and 256-bit OFF from 48-bit ON and 512-bit OFF.

During the ON period of signal BSAV' (e.g., when BSAV' is high) a signal of 76.8 KHz should be supplied to decoder 120. Hence, a combined signal, shown in FIG. 4E, of BSAV' and the delay signal from delay circuit 192 is supplied to the second input terminal IN2 of the XOR gate 194. During hte ON period, XOR gate 194 generates a signal of 76.8 KHz, and the battery saving signal BSAV' shown in FIG. 4C is generated through decoder 120 as a logic high. In essence, the duration of BSAV' during the ON period corresponds to a standard duration because a 76.8 kHZ signal is received by decoder 120. As soon as BSAV' changes to a logic low, however, the frequency applied to decoder 120 changes t 153.6 KHz due to the operation of delay circuit 192 and XOR gate 194. As a result, signal BSAV' remains at a logic low for a shorter duration than it would otherwise.

Consequently, decoder 120 generates BSAV' having 48-bit ON and 256-bit OFF periods. BSAV' is supplied to switch 140 to control the operating power supplied to the RF receiver 110 from battery 130. When BSAV' is low, switch 140 is open, and no paging signals are received. Since switch 140 is open for a shorter period of time in the non-standard mode, the success rate for receiving relatively short transmissions of preamble data is enhanced. By way of example, even if a paging signal having a short preamble of about 280 bits is received, the RF receiver 110 can process this signal.

Thus, if a non-standard radio paging signal including preamble data which does not satisfy the CCIR standard is received by pager 200, it can be processed by altering the period of the battery saving signal of the CCIR standard. Hence, if pager 200 is operating in a radio paging system of a non-standard design, in which preamble transmissions are shorter, the success rate for page reception is improved relative to a conventional pager.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A radio paging receiver comprising:

an antenna;

a radio frequency (RF) receiver for receiving a radio paging signal through said antenna;

a battery for supplying operating power to said RF receiver;

a switch coupled between said RF receiver and said battery, for routing said operating power to said RF receiver according to a battery saving signal;

an oscillator for providing an oscillating signal having a preset frequency;

a delay circuit for delaying said oscillating signal to provide a delayed signal;

an exclusive OR (XOR) gate for respectively receiving, through first and second input terminals thereof, said oscillating signal and a second signal derived from said delayed signal and said battery saving signal, and performing an XOR operation thereon to thereby produce a XOR output signal; and a decoder for decoding an output signal of said receiver, and supplying said battery saving signal in accordance with the frequency of said XOR output signal.

2. The radio paging receiver as claimed in claim 1, wherein:

said oscillating signal is a square wave;

said delay circuit delays said oscillating signal by 90°, such that said XOR output signal is at twice the frequency of said oscillating signal when said battery saving signal is logic low during an off period thereof;

said decoder being responsive to said XOR output signal having a higher frequency so as to decrease the duration of said off period of said battery saving signal.

3. The radio paging receiver as claimed in claim 1, wherein said oscillator provides said oscillating signal at 76.8 KHz.

4. The radio paging receiver as claimed in claim 3, wherein said delay circuit delays said signal of 76.8 KHz by 90°.

5. The radio paging receiver as claimed in claim 4, wherein said battery saving signal has a 48-bit ON period and a 256-bit OFF period.

6. A method for receiving a radio paging signal, comprising the steps of:

supplying operating power to a receiver according to an ON/OFF period determined by a battery saving signal;

providing an oscillating signal at a preset frequency;

delaying said oscillating signal to produce a delayed signal; and performing an exclusive OR (XOR) operation on first and second input signals to produce an XOR output signal, said first input signal being said oscillating signal, said second input signal being derived from said delayed signal and said battery saving signal; and modifying said ON/OFF period as a function of the frequency of said XOR output signal.

7. The method as claimed in claim 6 wherein said second input signal is substantially said delayed signal when said battery saving signal is a logic low, and is a logic high whenever said battery saving signal is a logic high.

8. The method as claimed in claim 6, wherein:

said oscillating signal is a square wave;

said delayed signal is delayed by 90° with respect to said oscillating signal, such that said XOR output signal is at twice the frequency of said oscillating signal when said battery saving signal is logic low during an off period thereof; and said ON/OFF period being modified as a result of said XOR output signal being twice the frequency of said oscillating signal, so as to decrease the duration of an off period of said battery saving signal by one half.

9. The method as claimed in claim 6, wherein said oscillating signal is at 76.8 KHz.

10. The method as claimed in claim 9, wherein said delaying step delays said oscillating signal of 76.8 KHz by 90°.

11. The method as claimed in claim 10, wherein said battery saving signal has a 48-bit ON period and a 256-bit OFF period.

* * * * *